United States Patent
Hart

(10) Patent No.: US 7,569,117 B2
(45) Date of Patent: Aug. 4, 2009

(54) MODEL SURFACE TEXTURING FILM

(75) Inventor: Craig R. Hart, Rochester Hills, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 531 days.

(21) Appl. No.: 11/381,816

(22) Filed: May 5, 2006

(65) Prior Publication Data

US 2007/0256779 A1   Nov. 8, 2007

(51) Int. Cl.
*B32B 33/00* (2006.01)
(52) U.S. Cl. .................. 156/249; 264/299; 264/338; 264/331.13; 264/331.18
(58) Field of Classification Search .................. 264/220, 264/226, 227; 156/249
See application file for complete search history.

(56) References Cited

U.S. PATENT DOCUMENTS

| 4,125,526 | A | * | 11/1978 | McCready | 264/552 |
| 4,797,246 | A | * | 1/1989 | Reinke et al. | 264/504 |
| 6,740,366 | B2 | * | 5/2004 | Hori et al. | 427/515 |
| 2004/0116548 | A1 | * | 6/2004 | Willson et al. | 522/31 |
| 2005/0064178 | A1 | * | 3/2005 | Gray et al. | 428/327 |

* cited by examiner

*Primary Examiner*—Eric Hug
*Assistant Examiner*—Saeed M Huda

(57) ABSTRACT

The invention concerns a texturing film that is flexible enough to be applied to a clay model to add texture and color to the surface of the clay model, and a method of forming and using the texturing film. The texturing film may be formed of a latex-based paint mixed with a high-solids water-based butyl ester polymer peelable coating.

15 Claims, 3 Drawing Sheets

MODEL SURFACE TEXTURING FILM

BACKGROUND OF INVENTION

The present invention relates generally to a film used to add the appearance of a texture to a surface of a model, and a method to produce such a film.

For certain products where design is an important feature, and in particular for larger, more expensive products, a clay model of the proposed design may be made before finalizing the design for production. This model may be full scale so designers and other decision makers at the manufacturer can view the design from every angle and determine if the shape and features are acceptable. Such a process is used, for example, when redesigning an automotive vehicle. For such a model, great pains are taken to assure the accuracy of every detail of the model since the preparation to manufacture such a vehicle may cost hundreds of millions of dollars.

One area that is sometimes neglected on such a model is the surface texture for surfaces that will not be smooth on the actual product. For example, on a vehicle, the sheet metal has a smooth surface, so the clay can be sculpted smooth. But for some components, such as, for example, interior components like seats, instrument panels and door panels, the actual product may have a particular surface texture. It may be important for visualizing the complete aesthetic appearance of the component or vehicle that these simulated components in the model have the appropriate texture and color. Thus, the ability to accurately represent an intended texture in clay is important in order to allow interior stylists and others to assess the appearance of modeled prototype interiors in a coherent and consistent fashion.

It is imperative that any attempt to add texture to surfaces of the clay model does not compromise the shape and surface features of that modeled component. However, due to the fragility of the clay surface, this can be difficult. Applying too much pressure at any point may deform the clay, thus compromising the shape of the model. Moreover, there may be creases and complex curvature on the model where a surface texture is desired, making the addition of surface texture in those areas difficult.

A rolled-grain (i.e., texturing) technique has been employed in the past where an object with the desired texture is rolled over the clay surface. However, such a technique has tended to limit the range of textures for which it can be applied, and the level of detail. Moreover, it can be difficult to apply the texture around creases and in areas with complex curvature.

Another technique for applying a surface texture employs heat-formable rigid plastic material that has a surface texture molded into it. But this technique generally requires application to a harder modeling material than clay, so it is used later in a vehicle development process when hard models cut out of wood or a similar hard materials are available. This delays the timing for determining desired surface textures later in the development process than is desired, and is much more expensive than is desired. In addition, since the materials available are relatively rigid, even after proper preparation, there is a necessity for an extensive amount of cutting, trimming, and fitting in order to completely cover a complex surface.

Yet another technique being explored is applying plastic films that have surface textures molded into them. While some of these show promise, they generally have several significant drawbacks. They are relatively difficult and very expensive to manufacture, and some may employ undesirable volatile organic chemical (VOC) compounds in their manufacture. In addition, many lack the desired strength, flexibility, shelf-life, texture retention, and/or shrink resistance desired in a texturing layer. And the color selection is more involved than is desired since these plastic films generally require very specific surface preparation for color coating.

SUMMARY OF INVENTION

An embodiment contemplates a method of forming a texturing film comprising the steps of: mounting a mold surface having a desired surface texture; applying a graining material onto the surface texture; waiting a predetermined amount of time for the graining material to partially polymerize, forming the texturing film; and removing the texturing film from the surface texture after partial polymerization and before the graining material fully polymerizes, to thereby retain flexibility for application to a surface while maintaining the surface texture.

An embodiment contemplates a method of forming a texture on a surface comprising the steps of: mounting a mold surface having a surface texture; applying a first mixture of a latex-based paint and a high-solids water-based butyl ester polymer peelable coating onto the surface texture; waiting a first predetermined amount of time for the second mixture to form a texturing film; removing the texturing film from the surface texture after the first predetermined amount of time; and applying the texturing film to the surface before a second predetermined amount of time, which is greater than the first predetermined amount of time.

An embodiment contemplates a graining material for forming a flexible texturing film for application to a surface of a model comprising: a latex-based paint, and a high-solids water-based butyl ester polymer peelable coating mixed with the latex-based paint.

An advantage of an embodiment is that the texturing film is flexible enough to apply without excessive pressure, thus insuring the integrity of the clay model, while still being able to retain the desired surface texture. And this flexibility is provided over a relatively long shelf life.

An advantage of an embodiment is that the desired surface texture and color of the clay model is accurately represented, allowing for improved evaluation of a model. This also allows for a wide range of texture and color choices available for applying to a desired surface. And the surface texture and color is provided at a desirable cost and at an early time in a typical vehicle design process. In addition, color change, when desired, is simple, low cost and relatively quick to implement.

DETAILED DESCRIPTION

Figure 1:
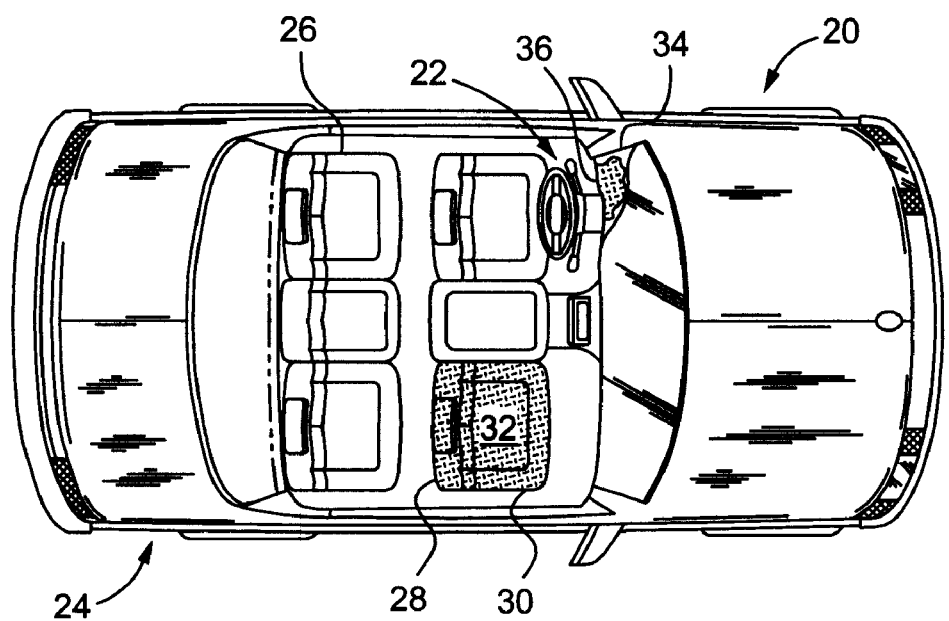
FIG. 1 is a partially cutaway, plan view of a clay model of an automotive vehicle.
Figure 2:
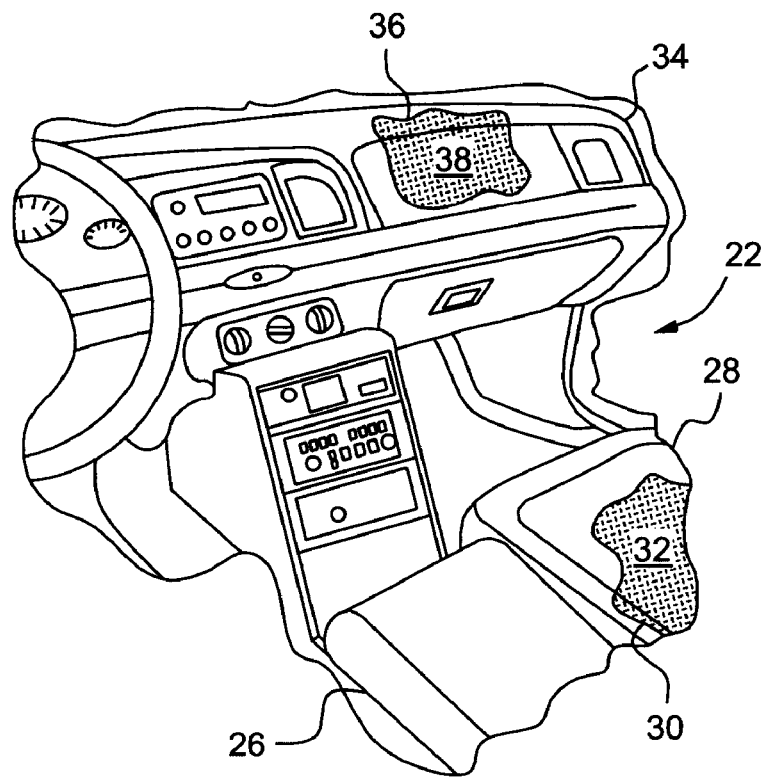
FIG. 2 is a cutaway, perspective view of a clay model of an automobile vehicle interior.
Figure 3:
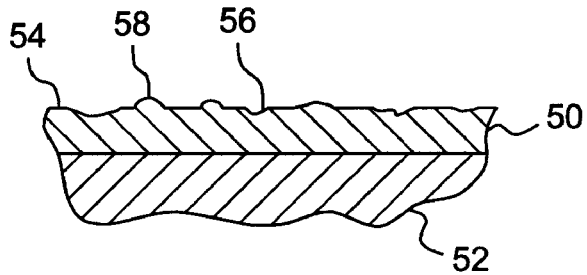
FIG. 3 is a schematic view of a step in a process of creating and using a texturing film.
Figure 4:
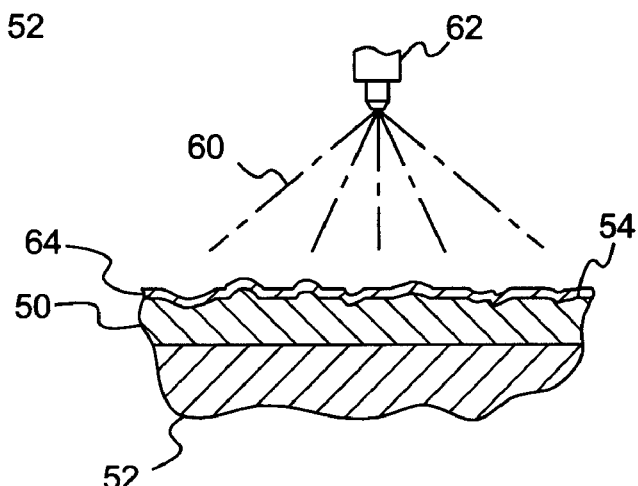
FIG. 4 is a schematic view of a step in a process of creating and using a texturing film.
Figure 5:
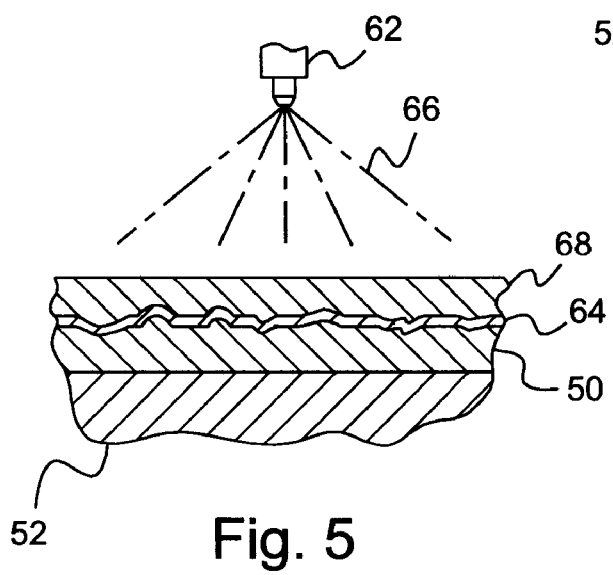
FIG. 5 is a schematic view of a step in a process of creating and using a texturing film.
Figure 6:
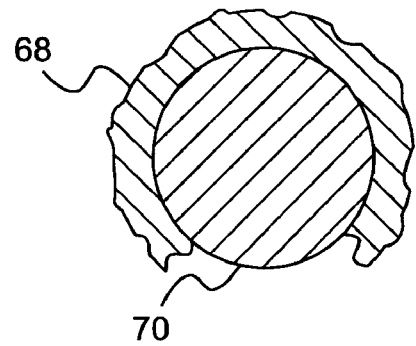
FIG. 6 is a schematic view of a step in a process of creating and using a texturing film.

FIGS. 1-2 illustrate a vehicle clay model 20, including a vehicle interior portion 22 and a vehicle exterior surface portion 24. The vehicle interior portion 22 has a model of seats 26, including a front passenger seat model 28 having a layer of texturing film 30 applied thereto. The layer of texturing film 30 includes a desired surface texture 32. The vehicle interior portion 22 also includes a model of an instrument panel 34 having another layer of texturing film 36 applied thereto. This layer of texturing film 36 may have the same or a different surface texture 38, as is desired for the particular application.

Figure 7:
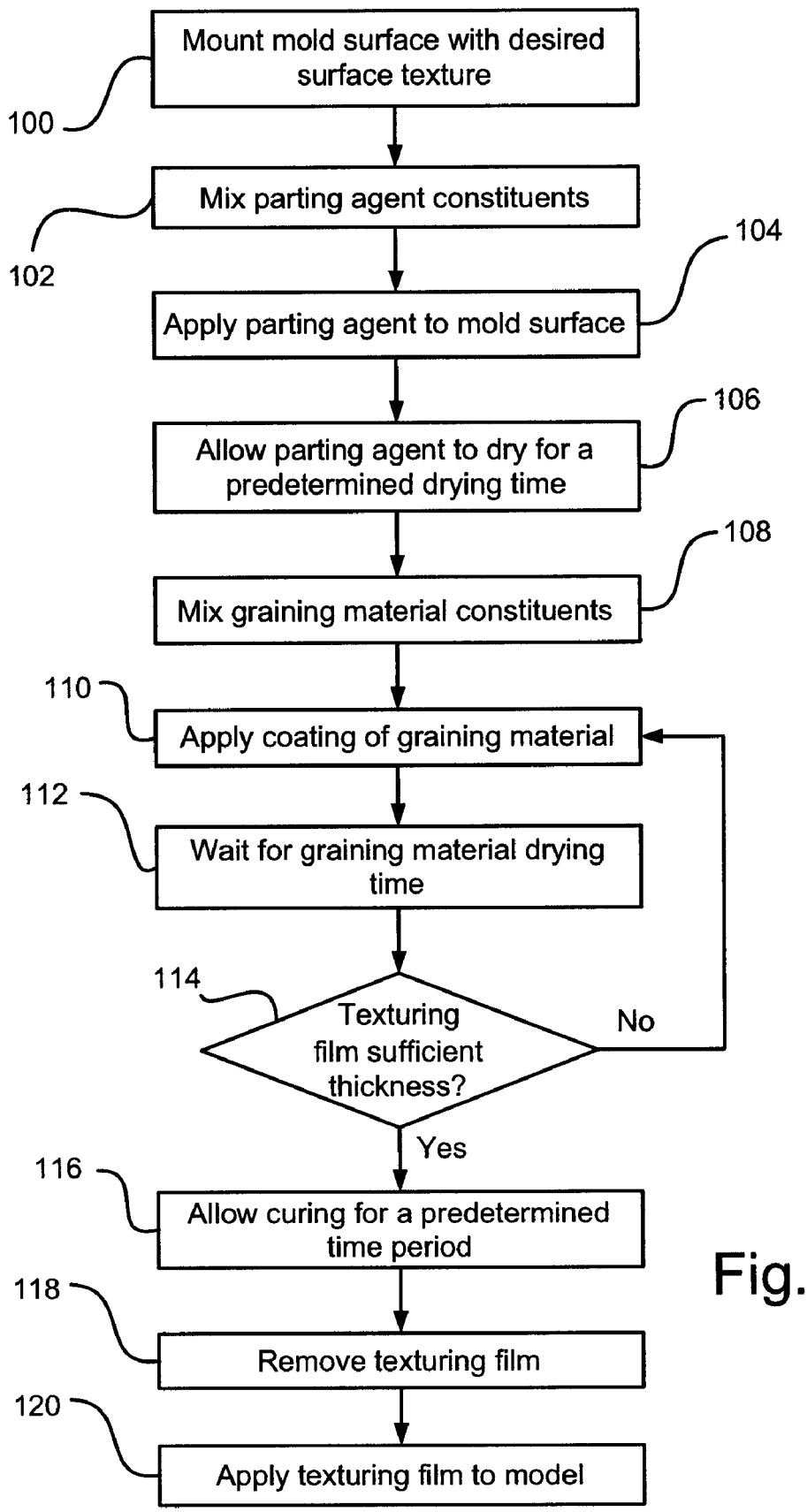
FIG. 7 is a flow chart illustrating a process of creating and using a texturing film.

FIG. 7, in conjunction with FIGS. 3-6, will now be discussed. It should be noted that FIGS. 3-6 are schematic, so the relative thicknesses of the material layers do not represent actual relative thicknesses between the layers—they are illustrated for ease and clarity in discussing this process. A process for creating and using a texturing film 30, 36, such as those discussed relative to FIGS. 1 and 2, may begin by mounting a mold surface (i.e., a substrate) 50 on a base 52, step 100. Preferably, the mold surface 50 is mounted horizontally with its surface texture 54 facing upward. The surface texture 54 may include dimples 56 and/or bumps 58, as appropriate, that simulate a particular desired material grain. The mold surface 50 can be a commercially available flat textured panel or any other corrugated, woven, grained, or otherwise textured surface. The mold surface 50 may include, for example, real leather, cloth materials, or silicone molds that have been previously molded on the surface of another object to retain its texture.

Parting agent constituents are mixed, step 102. The parting agent may be formed of equal parts by weight of Loctite® Frekote® 1450 DR polyethylene emulsion water-based mold release compound (manufactured by Loctite, a division of Henkel Corporation of Dusseldorf, Germany) and water, which may be ordinary tap water without any need for filtration, deionization, or any other treatment. The two liquids may be mechanically mixed together by hand or by machine, so long as the mixing is thorough.

The liquid parting agent mixture 60 is applied to the mold surface, step 104, forming a parting agent layer 64. The parting agent layer, then, will define the surface texture. The parting agent mixture 60 may be sprayed on, for example, with a conventional siphon-feed paint gun 62 at around fifty pounds per square inch air pressure onto the mold surface 50, which, as discussed above, is preferably oriented horizontally. The parting agent is allowed to dry for a predetermined amount of drying time, step 106. This drying time may be, for example, about fifteen minutes. The materials may be blended and applied at normal room temperature, humidity, and pressure, with no additional environmental controls required other than ordinary measures commonly used to contain paint overspray. Thus, the process is simple and the cost of application is kept to a minimum.

While steps 102, 104, and 106 are preferred when the material is, for example, leather, these steps are optional. In particular, for mold surfaces 50 made of materials such as silicone, it may be preferable to skip steps 102, 104, and 106, since a texturing film, discussed below, will release from silicone relatively easily. Thus, skipping these steps will save some time and expense. Of course, when these steps are skipped, there will not be a parting agent layer 64 on the mold surface 50.

Graining material constituents are mixed, step 108. The graining material may be formed of equal parts by weight of a latex-based paint and a high-solids water-based butyl ester polymer peelable coating. The latex-based paint may be, for example, Benjamin Moore® 215 Regal® wall satin latex-based, water-thinning paint (made by Benjamin Moore & Co. of Montvale, N.J.), which is a common grade house paint that contains about 02.0% ethylene glycol; 32.9% carbonic acid and calcium salt at 1:1; 15.0% clay (kaolin); 01.2% carbon black; 20.3% titanium dioxide; 00.2% silica, crystalline, quartz; 04.0% diatomaceous earth, natural; and 09.4% ceramic materials and wares, chemicals. The high-solids water-based butyl ester polymer peelable coating may be, for example, a peelable coating (made by Chemco Manufacturing Company of Northbrook, Ill.), which is a peelable paint-booth coating material that contains about 00.5% ethanol; 45/48% water; 0.25/0% octyl phenol condensed with 20 MOL ES ethylene oxide; 48/50% 2-propenoic acid, butyl ester, polymer with ethenyl acetate; and 0.25/0% alkyl amine. The two liquids may be mechanically mixed together either by hand or by machine, so long as the mixing is thorough.

Coloring may be added to the latex-based paint, if so desired, in order to produce a film that has a desired color in addition to the desired texture. The coloring material may be that used for conventional coloring of latex-based paints. Alternatively, as discussed below, the texturing film may be painted at a later time.

The liquid graining material 66 is applied, step 110. It is applied to the parting agent layer 64, if there is one; otherwise, it is applied directly to the mold surface 50. The graining material 66 may be sprayed, for example, with the siphon-feed paint gun 62 at around fifty pounds per square inch air pressure onto the parting agent layer 64 or mold surface 50, as the case may be. The materials may be blended and applied at normal room temperature, humidity, and pressure, with no additional environmental controls required other than ordinary measures commonly used to contain paint overspray. Again, the process is simple and the cost of application is kept to a minimum.

The graining material 66 is allowed to dry partially between coats, step 112, and begins to form a texturing film layer 68. It may also be applied in double coats, with the drying time between double coats being, for example, about five minutes. If all of the coats needed to form the desired thickness of the texturing film layer 68 have not been sprayed on, step 114, then another coating (or double coating) of graining material 66 is applied. The total number of coats may be, for example, about eight coats to obtain a desired thickness. If the texturing film layer 68 is the desired thickness, then the texturing film layer 68 is allowed to cure (partially polymerize) for a predetermined time, step 116. This predetermined time may be, for example, about four to five hours at 75° F., or alternatively, about two hours at 140° F. When the texturing film 68 is ready for removal, the cured film 68 is preferably removed by plucking up one edge by hand and then rolling the film 68 around a suitable cylindrical object, such as, for example, a wooden dowel 70, step 118.

The texturing film 68 may be stored and/or transported on the dowel 70 until ready for application onto the surface of a clay model, step 120, such as the model shown in FIGS. 1 and 2. The application to the surface of a clay model may include spraying the model surface with an aerosol adhesive and allowing it to dry to a tacky state before applying the texturing film 68. Then, an appropriately-sized portion of the film 68 is cut off of the roll and may be applied by hand. The texturing film 68 may be stretched and worked into the contours of the model surface and pressed into place with the fingers. Various other conventional devices, such as sponges, squeegees, scrapers, or probes (none shown), may be used to assist in following intricate detail on the mold surface, so long as the device is resilient enough to avoid damaging the texturing film 68. Also, if so desired, the texturing film 68 may be painted to provide the desired surface color.

The nature of the texturing film 68 is such that there is adequate surface strength in order to retain fine detail in the patterned surface after the partial polymerization (the initial curing), while still retaining sufficient flexibility to follow intricate contours without tearing, wrinkling, or bubbling. This is believed to occur because the latex blend on which the texturing film 68 is based partially polymerizes after a short period of time, allowing safe handling several hours after the spray application, but then the polymerization process progresses slowly, allowing a working time of from several days up to several weeks, depending upon the required flexibility for any given application. After approximately three weeks, the texturing film 68 tends to cure to the degree that its shape can no longer be altered without risk of cracking or tearing. But, during this time, it is useful in creating a grained texture on models—allowing for immediate evaluation and subsequent alteration.

The above description discusses a means of applying a desired texture to the clay surface of a model via a coating technique. Accordingly, although the disclosed embodiment herein concerns a clay model of a vehicle, the texturing film and method of fabrication and application may be applied to the vehicle exterior surface portion, and/or stand alone clay models of vehicle interior components, if so desired. And, moreover, it may be applied to other types of models (other than vehicles) where surface texturing and color is important to achieving an accurate visual image of the product being modeled.

While certain embodiments of the present invention have been described in detail, those familiar with the art to which this invention relates will recognize various alternative designs and embodiments for practicing the invention as defined by the following claims.

What is claimed is:

1. A method of forming a texturing film comprising the steps of:
   (a) mounting a mold surface having a surface texture;
   (b) applying a graining material onto the surface texture, with the graining material including a mixture of a latex based paint and a high-solids water-based butyl ester polymer peelable coating;
   (c) waiting a predetermined amount of time for the graining material to partially polymerize, forming the texturing film; and
   (d) removing the texturing film from the surface texture after step (c) and before the graining material fully polymerizes, to thereby retain flexibility for application to a surface while maintaining the surface texture.

2. The method of claim 1 wherein step (a) is further defined by the mold surface being mounted horizontally.

3. The method of claim 1 wherein step (a) is further defined by applying a parting agent to the mold surface, with the parting agent defining the surface texture.

4. The method of claim 3 wherein step (a) is further defined by the parting agent including a mixture of a polyethylene emulsion water-based mold release compound and water.

5. The method of claim 1 wherein step (b) is further defined by the mixture including equal parts by weight of the latex based paint and the high-solids water-based butyl ester polymer peelable coating.

6. The method of claim 1 wherein step (a) is further defined by applying a parting agent to the mold surface, with the parting agent defining the surface texture.

7. The method of claim 1 wherein step (c) is further defined by the predetermined amount of time being about two to five hours.

8. The method of claim 1 further including a step of: (e) applying the texturing film to a surface of a model before the graining material fully polymerizes.

9. The method of claim 1 further including a step of: (e) coloring the graining material prior to step (b).

10. A method of forming a texture on a surface comprising the steps of:
    (a) mounting a mold surface having a surface texture;
    (b) applying a first mixture of a latex based paint and a high-solids water-based butyl ester polymer peelable coating onto the surface texture, wherein the first mixture includes equal parts by weight of the latex based paint and the high-solids water-based butyl ester polymer peelable coating;
    (c) waiting a first predetermined amount of time for the second mixture to form a texturing film;
    (d) removing the texturing film from the surface texture after the first predetermined amount of time; and
    (e) applying the texturing film to the surface before a second predetermined amount of time, which is greater than the first predetermined amount of time.

11. The method of claim 10 wherein step (c) is further defined by the first predetermined amount of time being about two to five hours.

12. The method of claim 10 wherein (e) is further defined by the second predetermined amount of time being about three weeks.

13. The method of claim 10 wherein the surface is a clay surface on a model of a portion of a vehicle.

14. The method of claim 10 wherein step (d) is further defined by removing the texturing film by rolling the texturing film about a generally cylindrical object.

15. The method of claim 10 wherein step (a) is further defined by applying a second mixture of a polyethylene emulsion water-based mold release compound and water to the mold surface, with second mixture defining the surface texture to which the first mixture is applied.

* * * * *